United States Patent [19]

Lee et al.

[11] Patent Number: 4,460,713
[45] Date of Patent: Jul. 17, 1984

[54] MICROWAVE CURED SILICONE ELASTOMERIC FOAM

[75] Inventors: Chi-long Lee; Sherwood Spells, both of Midland, Mich.

[73] Assignee: Dow Corning Corporation, Midland, Mich.

[21] Appl. No.: 461,419

[22] Filed: Jan. 27, 1983

Related U.S. Application Data

[62] Division of Ser. No. 392,402, Jun. 25, 1982.

[51] Int. Cl.$^3$ .................................................. C08J 9/30
[52] U.S. Cl. ...................................... 521/122; 521/65; 521/127; 521/154
[58] Field of Search .................. 521/127, 154, 65, 122

[56] References Cited

U.S. PATENT DOCUMENTS 4,368,279  1/1983  Modic et al. ........................ 521/74

Primary Examiner—Morton Foelak
Attorney, Agent, or Firm—Edward C. Elliott

[57] ABSTRACT

A simplified method of manufacturing a silicone elastomeric foam comprises mechanically generating a stable froth of an aqueous emulsion, while adding surfactant and thickener, then exposing the stable froth to microwave energy to remove the water. The emulsion consists essentially of anionically stabilized hydroxyl endblocked polydiorganosiloxane, colloidal silica, an organic tin compound, and water, the emulsion having a pH in the range of 9 to 11.5 inclusive. The dried froth is an elastomeric, cellular structure possessing typical silicone elastomer heat stability and long-term aging stability.

8 Claims, No Drawings

MICROWAVE CURED SILICONE ELASTOMERIC FOAM

This application is a division, of application Ser. No. 392,402, filed June 25, 1982.

BACKGROUND OF THE INVENTION

1. Field of the Invention

This invention relates to silicone elastomeric foam produced by expanding an aqueous emulsion, then curing by removing the water with microwave energy.

2. Description of the Prior Art

A general method of foam production from elastomeric emulsions is known as the Talalay process. As described in U.S. Pat. No. 2,432,353, issued Dec. 13, 1938, a natural rubber latex is compounded with curing agents, then caused to expand with hydrogen peroxide. The expanding mixture is poured into an aluminum mold, the mold filled with foam is immersed in brine at −30° C. to freeze the contents. The frozen latex is coagulated by drawing alkaline calcium chloride brine at −2° C. through the foam. The mold with the coagulated foam is then exposed to live steam at 125° C. to vulcanize the natural rubber. Talalay teaches the preliminary formation of the foam can be effected by any of the known procedures, such as mechanical whipping, chemical gas generation, or physical release of gas or vapor.

In the book "Neoprene Latex", by J. C. Carl, published by E. I. Dupont DeNemours and Co. (Inc.) (1962) a process of converting specialized neoprene latex to foam is described. The latex fillers, curing agent, accelerator, and foam stabilizing surface active agents are mixed, then the mixture is stirred rapidly to whip in air and create a froth. The froth is stirred until it is refined to a smooth cream. A gelling agent is then added and the froth placed in a mold. The foam produced by the gelling of the froth is usually cured by exposure to steam. After curing, the foam is washed and dried.

The processes as discussed above require the gelling of the froth to stabilize the foam by the use of either an internal gelling agent as discussed for a neoprene latex or an external gelling agent as discussed with a natural rubber latex. This gelling step must be carefully controlled in order to produce satisfactory foam. Dunn in U.S. Pat. No. 3,491,033, issued Jan. 20, 1970, described a process of making a solid cellular material that does not contain a gelling step. Dunn describes his process as applicable to any polymer that is available in the form of an aqueous emulsion and is film forming at a temperature below 300° F. Dunn shows examples of foam production with natural rubber latex, butadiene-styrene latex, and also emulsions of thermoplastic polymers such as polyethylene and vinyl chloride. His process is carried out by adding a foaming agent, incapable of gelling the wet foam, to an aqueous dispersion, forming the mixture into a wet foam, drying the wet foam into a solid cellular material, and heating the solid cellular material to the film-forming temperature of the polymer. Dunn uses relatively large amounts of foaming agents to allow the foam structure to retain its cellular shape during the drying step. The emulsion used in the instant invention does not fall under Dunn, as the emulsion cannot be dried to a solid cellular material as called out by Dunn without gelling the foam, which is contrary to the requirement of Dunn.

Kittle and Ronk in U.S. Pat. No. 4,026,844, issued May 31, 1977, teach foaming a composition of polydiorganosiloxane gum base stock, hydroxyl containing organosiloxane, organohydrogensiloxane, acetylenic alcohol inhibitor, platinum, and a microwave sensible material. The mixture is foamed and cured by exposing the composition to a microwave source. The microwave energy heats the microwave sensible material, which in turn heats the other ingredients, resulting in a cured foam.

SUMMARY OF THE INVENTION

A silicone elastomeric foam is produced by mechanically generating a stable froth from an aqueous emulsion, then exposing the stable froth to sufficient microwave energy to remove the water from the emulsion. The emulsion, having a pH in the range of 9 to 11.5 inclusive, consists essentially of 100 parts by weight of anionically stabilized, hydroxyl endblocked polydiorganosiloxane in the form of an aqueous emulsion, at least one part by weight colloidal silica, an organic tin compound, and water. A surfactant and thickener are used to make a stable froth and maintain this froth during removal of the water from the emulsion by exposure to microwave energy. On exposing the stable froth to the microwave energy, the water heats and evaporates, providing some additional expansion of the froth during the process. After the water is evaporated, a cured silicone elastomeric foam remains.

The silicone elastomeric foam produced by the method of this invention is an open-cell foam with a fibrillar structure. The method of this invention allows the production of lower density foam than that obtained by other drying methods, such as oven drying or air drying, due to the added expansion that occurs during the exposure to microwave energy.

The process is an easy one, requiring only the production of a stable froth and then exposure of the stable froth to microwave energy. There is no separate coagulation and vulcanization step used in many other methods of producing foam. Exposing the stable froth to microwave energy causes the water to heat, boil, and evaporate very quickly, yielding a dry foam in much less time than would be required by other drying methods. The silicone elastomeric foam produced by this invention has excellent heat stability. The method of this invention can be performed without using blowing agents, and therefore there are no problems from toxic vapors or gases given off during the processing.

DESCRIPTION OF THE INVENTION

This invention relates to a method of drying a stable froth produced from an aqueous silicone emulsion suitable to provide an elastomeric product upon removal of the water comprising (i) mechanically generating a stable froth from a silicone emulsion comprising 100 parts by weight of anionically stabilized hydroxyl endblocked polydiorganosiloxane having an average molecular weight of greater than 10,000, in the form of an aqueous emulsion having a pH in the range of 9 to 11.5 inclusive; at least one part by weight colloidal silica; an organic tin compound; and water; adding sufficient anionic or nonionic surfactant and thickener to make the froth stable until the water is removed in step (ii), and then, (ii) exposing the stable froth to sufficient microwave energy to remove the water from the emulsion, forming an elastomeric foam.

The method of this invention, using the emulsion specified, allows the production of silicone elastomeric foam by a very easy process. The emulsion is mechanically generated into a stable froth, then the water is removed from the emulsion by exposing the stable froth to microwave energy to yield an elastomeric silicone foam. The composition of the emulsion is such that the stable froth formed as a first step is maintained until the water is removed in the second step. Once the water is removed, the original liquid emulsion becomes a dry, cured elastomeric foam.

The emulsion used in this invention contains an anionically stabilized hydroxyl endblocked polydiorganosiloxane in the form of an aqueous emulsion, colloidal silica, and an organic tin compound. These ingredients, used as specified in this invention, when dried produce a cured elastomeric material. Adding a thickener and surfactant to the above ingredients allows the production of a mixture which can be expanded into a stable froth. The surfactant aids in the potential for air entrapment during the mechanical generation of the froth and more uniform and smaller sized cells in the froth. The thickening agent aids in adjusting the viscosity of the froth so that the froth is rigid enough to maintain itself, yet not so thick that it can not form a froth. The stable froth is of such a nature that it maintains the emulsion as a froth during exposure to microwave energy and removal of the water. Because of the composition of the emulsion being used, the result is a cured, elastomeric foam.

In a batch operation, for instance, the anionically stabilized hydroxyl endblocked polydiorganosiloxane emulsion is placed in a mixing container, the colloidal silica is stirred in, the organic tin compound is added as an aqueous emulsion and sufficient amine is added to adjust the pH to the required range. Then surfactant and thickener are stirred in. The amount of surfactant and thickener can be adjusted during the mechanical generation of the froth. The resultant froth must be a stiff mass that will retain its shape and that contains a multitude of finely distributed cells or bubbles. The stable froth at this point may resemble the familiar whipped cream or shaving foam.

The mechanical generation of the stable froth can consist of rapidly stirring the emulsion in an open container. It can also consist of such methods as bubbling air into a container of emulsion or injecting air into the emulsion while stirring in a closed system such as an extruder.

The composition of the emulsion that is used in the method of this invention to produce an elastomeric foam allows the stable froth to be transformed into an elastomeric foam by exposing the froth to microwave energy to remove the water. Removing the water results in a cured elastomeric foam without any other ingredients or steps being necessary. The elastomeric foam resulting from removing the water from the stable froth is fully cured.

The water is removed from the stable froth by exposing it to microwave energy. The microwave energy has very little effect upon the polydiorganosiloxane present in the emulsion, but it very quickly heats the water present in the emulsion. The heated water rapidly evaporates or vaporizes because of the microwave energy being used. As the water vaporizes, it exerts pressure in the cells present in the stable froth and causes further expansion of the froth. The amount of additional expansion of the froth can be varied by the thickness of the froth and the rate of evaporation of the water. Doubling of the volume of the stable froth during this step of the method of this invention has been observed. The vaporizing water passes out of the stable froth easily because the froth is primarily open celled. Polydiorganosiloxane film is also very easily penetrated by water vapor. The drying froth may contract somewhat as the water is evaporating, because the pressure exerted by the evaporating water disappears as the froth dries. The dry foam is not heated by the microwave energy so the foam ceases to be heated because the water disappears. As soon as the water has evaporated from the stable froth, the foam can be removed from the microwave source because the stable froth is then a fully-cured elastomeric foam.

The method of this invention, using microwave energy to remove the water from the emulsion, allows the production of foam in much less time by drying the stable froth much more efficiently. Comparable froth thicknesses can be dried in 5 minutes using microwave energy, whereas drying in a hot air oven requires 1 to 2 hours. Because the drying period is shorter, it is possible to use less stabilizing surfactant and thickener in the production of stable froth for use with drying by microwave energy than when drying by hot air oven.

The composition of the emulsion used in the method of this invention must produce a froth which is stable during removal of the water. The stability of the froth is a function of the viscosity of the final emulsion among other things. The viscosity of the emulsion is a function of the ingredients used. The anionically stabilized hydroxyl endblocked polydiorganosiloxane should be one in which the polymer has a high molecular weight, thus a high viscosity. The use of a colloidal silica dispersion having a high solids content, for example 50 percent by weight colloidal silica, also aids in successful froth production. A fume silica can be added to the emulsion to raise the solids content and increase the viscosity and stiffness of the froth. Additional semi-reinforcing and extending fillers such as diatomaceous earth, finely ground quartz, alkaline clays, titanium dioxide, and non-acidic carbon black can be added. Common additives for silicone elastomers such as heat stability additives, compression set additives, and pigments are selected to maintain the emulsion at a pH in the range of 9 to 11.5 inclusive. Surfactant is used in the emulsion to reduce the surface tension and aid in the production of bubbles. The stiffness and stability of the froth is also aided by the use of a thickener which is added before or during the generation of the froth in an amount sufficient to make the froth stable through the water removal step. The preferred amount of thickener is easily found by experiment as shown in the Example.

The emulsion used in the method of this invention comprises water, an anionically stabilized hydroxyl endblocked polydiorganosiloxane, an organic tin compound, and colloidal silica, the emulsion having a pH in a range of 9 to 11.5 inclusive. Such an emulsion is described in U.S. Pat. No. 4,221,688, issued Sept. 9, 1980, to Johnson, Saam, and Schmidt, said patent being hereby incorporated by reference to describe the emulsion and how to manufacture it.

The hydroxyl endblocked polydiorganosiloxanes are those which can be emulsified and which impart elastomeric properties to the product obtained after the removal of the water from the emulsion. Such hydroxyl endblocked polydiorganosiloxanes should have a weight average molecular weight ($\overline{M}w$) of at least 10,000. Hydroxyl endblocked polydiorganosiloxanes with a lower $\overline{M}w$ range, such as 5000 to 10,000, do not provide strong elastomeric products. Tensile strengths and elongations at break improve with increasing molecular weight, with reasonable tensile strengths and elongations obtained above 30,000 $\overline{M}w$ and the best tensile strengths and elongations obtained above 50,000 $\overline{M}w$. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical. The preferred $\overline{M}w$ for the hydroxylated polydiorganosiloxanes are in the range of 200,000 to 700,000. The viscosity of the polymer obtained upon removal of the water from the emulsion will vary from about 75 Pa·s at 25° C. to about 4,000 Pa·s at 25° C. with the preferred range from about 1,000 Pa·s at 25° C. to 3,000 Pa·s at 25° C.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl, and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom that can include trace amounts of monoorgano or triorganosiloxy groups present as impurities of the manufacturing process. The preferred hydroxyl endblocked polydiorganosiloxanes are the hydroxyl endblocked polydimethylsiloxanes.

The most preferred hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization and to show the hydroxyl endblocked polydiorganosiloxane in emulsion. Another method of preparing hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes and their method of preparation. These methods and others are known in the art. The hydroxyl endblocked polydiorganosiloxanes used in the emulsion are those which are anionically stabilized. As used herein, "anionically stabilized" means the hydroxyl endblocked polydiorganosiloxane is stabilized in emulsion with an anionic surfactant.

Anionic surfactants are preferably the salt of the surface active sulfonic acids used in the emulsion polymerization to form the hydroxyl endblocked polydiorganosiloxane as shown in U.S. Pat. No. 3,294,725 cited above which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids, and aliphatically substituted diphenylethersulfonic acids.

One of the advantages of the emulsions described herein is the relatively small amount of surfactant or emulsifying agent needed to maintain a stable emulsion. The amount of anionic emulsifying agent can be less than 2 weight percent of the emulsion, wherein this amount can result from the neutralized sulfonic acid wherein the sulfonic acid is used in the emulsion polymerization method for the preparation of the hydroxyl endblocked polydiorganosiloxane. Other anionic emulsifying agents can be used, for example, alkali metal sulforicinoleates, sulfonated glyceryl esters of fatty acids, salts of sulfonated monovalent alcohol esters, amides of amino sulfonic acids such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate and sodium lauryl ether sulfate.

Although not specifically required, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

Colloidal silica is a required ingredient of the emulsions. Any of the colloidal silicas can be used. These colloidal silicas are well known in the art and many are commercially available. Although any of the colloidal silicas can be used, including fume colloidal silicas and precipitated colloidal silicas, the preferred colloidal silicas are those which are available in an aqueous medium. Colloidal silicas in an aqueous medium are usually available in a stabilized form, such as those stabilized with sodium ion, ammonia or an aluminum ion. Aqueous colloidal silicas which have been stabilized with sodium ion are preferred because the pH requirement can be met by using such a sodium ion stabilized colloidal silica without having to add additional ingredients to bring the pH within the range of 9 to 11.5. The term "colloidal silica" as used herein are those silicas which have particle diameters of from 0.0001 to 0.1 micrometer. Preferably, the particle diameters of the colloidal silicas are from 0.001 to 0.05 micrometer. The relative amounts of hydroxyl endblocked polydiorganosiloxane and colloidal silica can vary over a wide range, such as from 1 part to 150 parts by weight of colloidal silica for each 100 parts by weight of hydroxyl endblocked polydiorganosiloxane. Amounts of colloidal silica from 10 to 50 parts by weight for each 100 parts by weight of hydroxyl endblocked polydiorganosiloxane are preferred in the method of the instant invention.

The silicone emulsion has a continuous water phase in which there is a dispersed phase which comprises an anionically stabilized hydroxyl endblocked polydiorganosiloxane and colloidal silica. For this silicone emulsion to maintain a storage stability and also be curable to an elastomer after the emulsion is stored, the pH of the silicone emulsion must be within the range of 9 to 11.5 inclusive. The silicone emulsions which have the best storage stability and still form elastomers at ambient conditions at any point during the storage stable period are those which have a pH in the range of 10.5 to 11.2.

A silicone emulsion of hydroxyl endblocked polydiorganosiloxane and colloidal silica does not provide a useful elastomeric product when the water is allowed to evaporate at ambient conditions immediately after the emulsion is prepared. An aging period is necessary before an elastomer can be formed from the emulsion, but such an aging period can take a long time, such as up to five months. The addition of an organic tin compound, preferably a dialkyltindicarboxylate, can be used to reduce the aging period to one to three days. After the aging period, an elastomeric product can be obtained from the removal of the water under ambient conditions. Dialkyltindicarboxylate can be used in amounts of from 0.1 to 2 parts by weight for each 100 parts by weight of the hydroxyl endblocked polydiorganosiloxane, preferably about 0.25 to 1.5 parts by weight are used. Dialkyltindicarboxylates include dibutyltindiacetate, dibutyltindilaurate, and dioctyltindilaurate. The preferred dialkyltindicarboxylate is dioctyltindilaurate.

The long-term storage stability of the emulsion has been found to be improved by the addition of an organic amine. The organic amine can be primary, secondary, or tertiary amines which contain carbon, hydrogen, and nitrogen, and can also contain oxygen, and which are water soluble in the amounts required. These organic amines include diethylamine, ethylenediamine, butylamine, hexylamine, morpholine, monoethanolamine, triethylamine, and triethanolamine. The preferred amine is diethylamine. The organic amines can be added neat or in aqueous emulsion provided that they do not cause the anionically stabilized hydroxyl endblocked polydiorganosiloxane emulsion to break during their addition. For this reason, it is preferable to add the amine as an aqueous solution.

A thickening agent is used to adjust the viscosity or stiffness of the froth so that the froth is maintained until the water is removed. Suitable thickeners are available commercially and would be selected for their stability and usability in thickening the emulsion at a pH in the range of 9 to 11.5 inclusive. Some of the useful thickeners include the classes of cellulose derivatives, alkali salts of polyacrylates and polymethacrylates, sodium and ammonium salts of carboxylate copolymers, and colloidal clays. These and other thickeners can be used but it is advisable that a particular thickener be tried on a small scale to determine that it does not adversely effect the storage stability of the emulsion or the resulting properties of the elastomeric foam. Because the method of this invention dries the stable froth rapidly, in only a few minutes, the froth does not require the long term stability necessary for drying at room temperature or in a hot air oven. Because of this, the amount of thickener needed may be lower than is required for other drying methods.

The method of this invention is useful for producing silicone elastomeric foam of low density. The method yields a generally open-cell foam with a fibrillar structure that appears stronger than other types of silicone open-cell foams such as those prepared from room temperature curing silicone elastomers as described by Bruner in U.S. Pat. No. 3,070,555, issued Dec. 25, 1962. The present method can be performed without using anything other than air and water for froth producing agents, and therefore there are no toxicity or pollution problems with this method of foam production. The simplicity of the method of this invention enables the use of existing equipment. Gelling agents used in many other methods are not needed in the present invention. The dried foam requires no film forming or curing step other than removing the water from the emulsion.

The exposure of the stable froth to the microwave energy can dry the froth very rapidly, for instance in 5 minutes, rather than several hours by oven drying or days by air drying. The use of microwave energy is especially efficient, as the water in the emulsion is easily heated by the microwaves, resulting in less energy being required to evaporate the water from the emulsion. The method of this invention can be easily adapted for the continuous production of foam sheet.

Because the stable froth is dried very rapidly, it is possible to use a less stable froth than is necessary when oven drying. The stable froth can contain less surfactant and thickener and still be sufficiently viscous to remain stable through the drying period.

The density of the foam is easily regulated by the amount of air or gas introduced during the expanding step and the rate of microwave energy used. The silicone elastomeric foam is useful for applications needing an open-cell foam with elastomeric properties that resist extremes of temperature or long-term aging effects, such as cushioning which is exposed to temperature extremes.

The following example is included for illustrative purposes and should not be construed as limiting the scope of the invention which is properly delineated in the claims. All parts are parts by weight.

EXAMPLE

A sample of foam was prepared by mechanical stirring then dried by use of microwaves.

An anionic emulsion was prepared by homogenizing hydroxyl endblocked polydimethylsiloxane with an average degree of polymerization of 35 with an emulsifier of sodium lauryl sulfate, and water, then polymerizing with dodecylbenzenesulfonic acid to give a stable emulsion with a pH value of about 2. The emulsion was neutralized by adding a mixture of diethanolamine in water. The emulsion had a pH of about 8, a solids content of about 52 percent by weight, and the viscosity of the hydroxyl endblocked polydimethylsiloxane removed from the emulsion was about 300 Pa·s at 25° C.

A reinforced emulsion was prepared by mixing 200 parts of the above hydroxyl endblocked polydimethylsiloxane emulsion, 100 parts of an aqueous, sodium stabilized, colloidal silica dispersion of 15% by weight solids, 20 parts of finely divided titanium dioxide, 2 parts of diethylamine, and 1 part of an aqueous emulsion containing 50 percent by weight dioctyltin dilaurate.

A. A mixture of 400 g of the above emulsion and 2 g of sodium lauryl sulphate was stirred for 2 minutes with a Kitchen Aid mixer. Then 5 g of an acrylic thickener were stirred in to give emulsion of pH of 11.2. The stirring continued for 2 minutes to yield a white, shaving cream-like, liquid froth resembling shaving foam.

The froth thus obtained was transferred into a paper cup and placed into a microwave oven operated at 500 watts input at a frequency of 2450 megahertz. Further expansion instantly took place due to evaporation of the water. After 5 minutes, an elastomeric foam was removed from the oven. The white soft elastomeric foam had a density of 170 kg/m$^3$.

B. The procedure of A was repeated with the exception of operating the microwave oven at 250 watts input. After a drying time of 5.5 minutes, an elastomeric foam was removed. A white elastomeric foam with a density of 340 kg/m³ was obtained.

A comparative test was prepared to illustrate the advantage of the drying method of this invention. Froth produced as in A was placed in a hot air oven at 125° C. as a comparison of drying methods. The froth collapsed during drying; a useful foam was not obtained.

These two samples illustrate the usefulness of the method of this invention in that the method of this invention makes the production of useful foam much less critical than other methods of drying, such as drying in a hot air oven.

That which is claimed is:

1. An elastomeric silicone foam produced by drying a stable froth produced from an aqueous silicone emulsion suitable to provide an elastomeric product upon removal of the water comprising
   (i) mechanically generating a stable froth from a silicone emulsion comprising 100 parts by weight of anionically stabilized hydroxyl endblocked polydiorganosiloxane having an average molecular weight of greater than 10,000, in the form of an aqueous emulsion having a pH in the range of 9 to 11.5 inclusive; at least one part by weight colloidal silica; an organic tin compound; and water; adding sufficient anionic or nonionic surfactant and thickener to make the froth stable until the water is removed in step (ii), and then,
   (ii) exposing the stable froth to sufficient microwave energy to remove the water from the emulsion, forming an elastomeric foam.

2. The foam of claim 1 wherein the stable froth is mechanically generated by mixing air into the emulsion.

3. The foam of claim 2 wherein the mixing means is a mechanical stirrer.

4. The foam of claim 2 wherein the mixing means is injection of air into the emulsion.

5. The foam of claim 2 wherein the stable froth of step (i) is transferred to a substrate or mold before the removal of the water.

6. The foam of claim 1 wherein the polydiorganosiloxane is a polydimethylsiloxane having an average molecular weight of greater than 50,000, the colloidal silica is greater than 10 parts by weight, and the tin compound is dialkyltindicarboxylate in an amount of from 0.1 to 2 parts by weight.

7. The foam of claim 6 wherein the polydimethylsiloxane has an average molecular weight of from 200,000 to 700,000.

8. The foam of claim 7 wherein the stable froth in mechanically generated by mixing air into the emulsion by means of a mechanical stirrer.

* * * * *

UNITED STATES PATENT AND TRADEMARK OFFICE
CERTIFICATE OF CORRECTION

PATENT NO. : 4,460,713
DATED : July 17, 1984
INVENTOR(S) : Chi-long Lee, Sherwood Spells It is certified that error appears in the above-identified patent and that said Letters Patent is hereby corrected as shown below:

In column 10, line 24, "froth in" should read -- froth is --.

Signed and Sealed this

Nineteenth Day of March 1985

[SEAL]

Attest:

DONALD J. QUIGG

Attesting Officer  Acting Commissioner of Patents and Trademarks